United States Patent [19]
Gardner et al.

[11] Patent Number: 5,373,062
[45] Date of Patent: Dec. 13, 1994

[54] CURING SYSTEMS FOR HALOGENATED ELASTOMERS

[75] Inventors: Irwin J. Gardner, Scotch Plains, N.J.; Donald S. Tracey, Kingwood, Tex.

[73] Assignee: Exxon Chemical Patents Inc., Linden, N.J.

[21] Appl. No.: 55,125

[22] Filed: Apr. 29, 1993

[51] Int. Cl.$^5$ ................................................. C08F 8/42
[52] U.S. Cl. ............................ 525/333.4; 525/334.1; 525/343; 525/360; 525/363
[58] Field of Search .................. 525/333.4, 334.1, 343, 525/360, 363

[56] References Cited
U.S. PATENT DOCUMENTS

| | | | |
|---|---|---|---|
| 2,940,960 | 6/1960 | Tegge et al. | 260/88.3 |
| 3,099,644 | 7/1963 | Parker et al. | 260/85.3 |
| 3,532,649 | 10/1970 | Smith et al. | 260/18 |
| 5,162,445 | 11/1992 | Powers et al. | 525/333.4 |

*Primary Examiner*—Bernard Lipman
*Attorney, Agent, or Firm*—J. E. Schneider; M. B. Kurtzman

[57] ABSTRACT

An improved promoted curing system for halogenated elastomers has been discovered wherein the curing system contains one or a mixture of bismuth carboxylates having the structure of Formula 1:

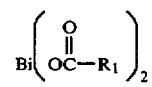

wherein $R_1$ is selected from the group consisting of straight or branched chain alkyl groups having from 4 to about 30 carbon atoms, aromatic groups containing 6 to about 30 carbon atoms and alkaryl groups containing from 7 to about 30 carbon atoms.

It has been found that the use of these bismuth salts, alone or in combination with zinc compounds in the cure of compositions containing halogenated elastomers leads to full, low reversion cures and curable compositions exhibiting very low precure scorch properties.

19 Claims, No Drawings

CURING SYSTEMS FOR HALOGENATED ELASTOMERS

FIELD OF THE INVENTION

The present invention relates to the use of bismuth carboxylates alone or in combination with zinc compounds as scorch retarders for compositions containing halogenated elastomers, particularly elastomeric interpolymers containing isobutylene and para haloalkyl-substituted styrene.

BACKGROUND OF THE INVENTION

Halogenated copolymers of isobutylene and up to about 4 mole % of isoprene (butyl rubber) are well known polymer materials whose vulcanizates offer some outstanding properties not possessed by many other diolefin based elastomers. Articles prepared from many cured halogenated elastomers offer improved resistance to oils and greases as well as resistance to oxygen and ozone degradation. Butyl rubber vulcanizates exhibit good abrasion resistance, excellent impermeability to air, water vapor and many organic solvents, as well as resistance to aging and sunlight. These properties render these materials ideal candidates for one or more applications such as water hoses, organic fluid hoses, components in tire construction, gaskets, adhesive compositions and various molded articles.

More recently, a new class of halogenated elastomeric interpolymers have been discovered which offer many of the same properties as halogenated butyl rubber, but are even more ozone and solvent resistant and are more readily curable. These materials are the halogenation product of random copolymers of a $C_4$ to $C_7$ isoolefin, such as isobutylene, and a para-alkyl styrene comonomer wherein at least some of the alkyl substituent groups present in the styrene monomer units contain halogen. Preferred materials may be characterized as isobutylene interpolymers containing the following monomer units randomly spaced along the polymer chain:

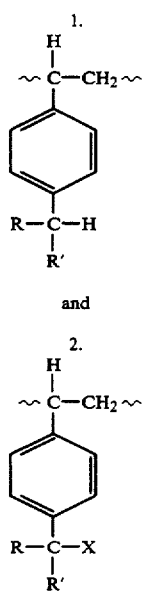

wherein R and R' are independently hydrogen, lower alkyl, preferably $C_1$ to $C_4$ alkyl and X is bromine or chlorine, and wherein the interpolymer is otherwise substantially free of ring halogen or halogen in the polymer backbone chain. Preferably R and R' are each hydrogen. Up to about 60 mole % of the para-alkyl styrene present in the interpolymer structure may be the halogenated structure (2) above.

Most preferred materials are elastomeric copolymers of isobutylene and para-methylstyrene containing from about 0.5 to about 20 mole % para-methyl styrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 5, more preferably less than about 2.5, viscosity average molecular weights in the range of from about 300,000 up to about 2,000,000, and a glass transition temperature (Tg) of below about 50° C.

These copolymers may be prepared by solution polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.1 to about 2 mole % of bromomethyl groups, most of which is monobromomethyl, with less than 0.05 mole % dibromomethyl substituents present in the copolymer. These copolymers and their method of preparation are more particularly disclosed in U.S. Pat. No. 5,162,445, the complete disclosure of which is incorporated herein by reference.

The aromatic halomethyl groups present in such copolymers permit facile cross linking to be accomplished in a variety of ways, including by means of zinc oxide or promoted zinc oxide curing systems normally used to cure halogenated butyl rubber.

Illustrative of known curing agents or accelerators which can be used alone or in conjunction with zinc oxide for curing halogenated elastomers are brominated alkyl phenol resin; N,N'-diethylthiourea; di-otho-(tolyl)guanidine salt of dicatechol borate; dipentamethylene thiuram tetrasulfide; ethylene trithiocarbamate; 2-mercaptobenzothiazole; alkyl or aryl benzothiazole disulfides, tetramethylthiuram disulfide, zinc diethyldi-thiocarbamate, zinc dibutyldithiocarbamate, and zinc dimethyldi-thiocarbamate. A preferred known cure system comprises zinc oxide and dipentamethylene thiuram tetrasulfide.

It has been found that halogenated copolymers of isobutylene and para-methylstyrene described above exhibit a very rapid onset of cure which is known as precure scorch, even more rapid than that associated with halobutyl rubber. Normally these rubbers are processed by first forming a mixture of the elastomer, filler, processing aids and other non-curative additives in a suitable mixing device such as a Banbury Mixer or two roll mill and at temperatures in the order of 75° to 180° C. After forming a homogeneous mixture, the composition is then prepared for vulcanization by the further mixing in of crosslinking agents such as ZnO or promoted ZnO systems, after which the curable composition is milled and sheeted out as is known in the art. It is imperative that the onset of curing in such systems (known as precure scorch) be delayed for as long as necessary to permit the processor to sheet out and shape the curable composition prior to the application of sufficient heat to properly cure the composition. It has been found that the more conventional vulcanization accelerators used with ZnO to cure halogenated isobutylene/-para-methylstyrene elastomers lead to high precure scorch. These accelerators include the zinc and ammonium salts of dialkyl and diaryl dithiocarbamates.

Accordingly, it is an object of this invention to provide vulcanization systems for halogenated elastomers, particularly brominated interpolymers of isobutylene and para-methylstyrene, which exhibit low precure scorch properties.

It is a further object of this invention to provide vulcanization systems for curable halogenated elastomers which provide for the development of a full cure with minimum cure reversion and maximum cure stability.

SUMMARY OF THE INVENTION

In accordance with the present invention, an improved promoted curing system for halogenated elastomers has been discovered wherein the curing system contains one or a mixture of bismuth carboxylates having the structure of Formula 1:

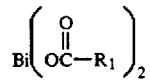

wherein $R_1$ is selected from the group consisting of straight or branched chain alkyl groups having from 4 to about 30 carbon atoms, aromatic groups containing 6 to about 30 carbon atoms and alkaryl groups containing from 7 to about 30 carbon atoms.

It has been found that the use of these bismuth salts, alone or in combination with zinc compounds in the cure of compositions containing halogenated elastomers leads to full, low reversion cures and curable compositions exhibiting very low precure scorch properties.

DETAILED DESCRIPTION OF THE INVENTION

The halogenated elastomer present in the curable compositions of this invention may include chlorinated or brominated butyl rubber, chlorinated or brominated interpolymers of a $C_4$ to $C_7$ isolefin and a para-alkyl styrene, mixtures thereof or mixtures of one or both of these elastomers with other elastomers such as polybutadiene, copolymers of butadiene with styrene or acrylonitrile, natural rubber, polychloroprene or elastomeric copolymers of ethylene, propylene and up to 10 mole % of a non-conjugated diene (known as EPDM rubber).

The preferred halobutyl rubbers are based or chlorinated or brominated copolymers of isobutylene with up to about 4 mole % of isoprene. These elastomers generally have a number average molecular weight within the range of about 50,000 up to about 500,000 and may be prepared by polymerization and halogenation methods well known in the art such as disclosed in U.S. Pat. Nos. 2,940,960 and 3,099,644, the disclosures of which are incorporated herein by reference.

Halogenated interpolymers based on a $C_4$ to $C_7$ isoolefin, such as isobutylene, and a Para-alkylstyrene, such as para methylstyrene, are also now known in the art as evidenced by the aforementioned U.S. Pat. No. 5,162,445. These elastomers are inclusive of those described in the Background section of this disclosure.

Preferred materials are the halogenation product of a random copolymer of a $C_4$ to $C_7$ isoolefin, such as isobutylene, and a para-alkyl styrene comonomer wherein at least some of the alkyl substituent groups present in the styrene monomer units contain halogen. Preferred materials may be characterized as isobutylene interpolymers containing the following monomer units randomly spaced along the polymer chains:

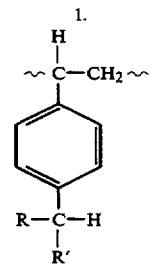

and

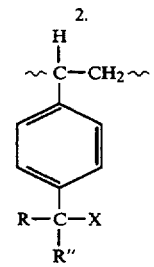

wherein at least about 5 mole % of the comonomer units present in the polymer chain are of the structure of formula 2, R and R' are independently hydrogen or $C_1$ to $C_4$ alkyl, R" is independently hydrogen, $C_1$ to $C_4$ alkyl or X, and X is bromine or chlorine, and wherein the interpolymer is otherwise substantially free of any halogen in the polymer backbone chain.

With reference to isobutylene as the isoolefin comonomer, these interpolymers are inclusive of:

a) copolymers consisting of isobutylene and a monomer having the structure of formula 2 wherein R" is hydrogen or $C_1$ to $C_4$ alkyl, eg, copolymers of isobutylylene and a monohalo-substituted para alkyl styrene;

b) terpolymers comprising isobutylene and a mixture of monomers having the structure of formulas a 1 and 2 wherein R" is hydrogen or $C_1$ to $C_4$ alkyl, eg, terpolymers of isobutylene, a para alkyl styrene and a monohalo-substituted para alkyl styrene;

c) terpolymers comprising isobutylene and a mixture of monomers having the structure of formula 2 wherein, with respect to a major proportion of the formula 2 monomer, R" is hydrogen or $C_1$ to $C_4$ alkyl and, with respect to a minor proportion of said formula 2 monomer, R" is bromine or chlorine, eg, terpolymers of isobutylene, a mono-halo substituted para alkyl styrene and a di-halo substituted para alkyl styrene; and d) tetrapolymers comprising isobutylene and a mixture of monomers having the structure of formulas 1 and 2 wherein, with respect to major proportion of the formula 2 monomer, R" is hydrogen or $C_1$ to $C_4$ alkyl and, with respect to a minor proportion of said formula 2 monomer, R'' is bromine or chlorine, eg, tetrapolymers of isobutylene, a para alkyl styrene, a monohalo-substituted para alkyl styrene and a dihalo-substituted para alkyl styrene.

As stated above, these halogenated interpolymers are prepared using a copolymer of a $C_4$ to $C_7$ isoolefin and a para-alkyl styrene as the halogenation substrate. Interpolymers having the composition (a), (b), (c) or (d) above will be produced as a function of the severity of the halogenation reaction. For example, mild halogenation will tend to yield interpolymers of the characteristics of (b), stronger halogenation will yield interpolymers of the characteristics of (a) or (d) and the strongest halogenation will yield terpolymers having the characteristics of (c).

The most preferred elastomers used in the compositions of the present invention are random elastomeric brominated terpolymers comprising isobutylene and para-methylstyrene (PMS) containing from about 0.5 to about 20 mole % PMS, more preferably from about 2 to about 15 mole % PMS, wherein up to about 60 mole % of the PMS monomer units contain a monobromomethyl group. These elastomeric copolymers generally exhibit a number average molecular weight in the range of from about 50,000 to about 250,000, more preferably from about 80,000 to about 180,000. From about 5 up to about 60 mole % of the total PMS monomer content of the terpolymer contains a monobromomethyl group with essentially no bromination occurring in the polymer backbone or in the aromatic ring. The bromine content of these terpolymers generally ranges from about 0.1 to about 5 mole %.

An advantage of elastomer compositions containing halogenated butyl rubber, or particularly, halogenated isobutylene—PMS interpolymers is that they may be more readily covulcanized with other general purpose elastomers such as polybutadiene, natural rubber and the like as well as EPDM elastomers. This characteristic is due primarily to the fact that these halogenated materials can be made to co-cure with more highly unsaturated rubber by mechanisms which are independent of the sulfur and promoted sulfur systems used to cure the more highly unsaturated elastomers.

Scorch retarders which have been found to offer the advantages of both low precure scorch and low cure reversion are the overbased bismuth dicarboxylates the structure of Formula 1 above. Preferred salts are those wherein $R_1$ in Formula 1 are alkyl groups containing from 5 to about 22 carbon atoms.

$R_1$ should be of sufficient chain length such that the carboxylate is at least partially soluble in hydrocarbons. Preferred salts include those derived from hexanoic, neodecanoic, 2-ethylhexanoic dodecanoic, pentadecanoic, 2,3-dimethylpentanoic and naphthenic acids. Preferred materials are commercially available from Mooney Chemicals Corp. under the designation bismuth "Ten Chem" which is a solution containing 16% by weight of bismuth neodecanoic salt and 40% by weight free neodecanoic acid and bismuth "Hex Chem" which is a solution containing 28% by weight of bismuth hexanoic acid salt and 14% by weight of free hexanoic acid. Mixed bismuth carboxylates may also be used.

The quantity of the bismuth carboxylate retarder used in the cure of the halogenated elastomer will vary as a function of the halogen content of the elastomer. Generally, it is employed in the range of from about 0.5 to about 8.0 parts by weight (based on the weight of bismuth carboxylate) per 100 parts by weight of halogenated elastomer present in the curable composition, more preferably in the range of about 1.0 to about 4.0 parts by weight per 100 parts by weight of halogenated elastomer.

The retarders may be used in curing systems also containing a zinc compound as the primary curative agent. Zinc oxide or zinc bromide may normally be used in such systems at a level of from about 0.2 to about 7 parts by weight per 100 parts by weight of halogenated elastomer. The present invention provides for particularly good low cure reversion and low precure scorch where zinc oxide is present at relatively low levels in the range of from about 0.3 to about 1.5 parts by weight per 100 parts by weight of halogenated elastomer.

The compositions of this invention may also contain a blend of the halogenated elastomers with other elastomers such as natural rubber, polybutadiene, copolymers of butadiene with styrene or acrylonitrile, EPDM elastomers and like materials. Such blends may contain from about 10 to about 90% by weight of each type of elastomer, more preferably from about 25 to 75% by weight. The most preferred blends are those containing the halogenated elastomer in major proportion, e.g., greater than 50% by weight of the elastomer content of the composition is the halogenated elastomer.

The compositions of this invention may also contain sulfur, a sulfur-containing curative or a non-sulfur-containing curative as are known in the art. Examples of such compounds are sulfur, benzothiazyl disulfide, N-oxydiethylene benzothiazole-2-sulfenamide, 2-mercaptobenzothiazole, tetramethylthiuram disulfide, M-phenylene bis-maleimide, 2-mercapto-4,5-methyl-benzimidazole and like materials, provided they do not materially affect the low precure scorch properties of the composition.

The vulcanizable composition may also contain other conventional additives known in the art, including fillers such as carbon black or silica, stabilizers, antioxidants, plasticizers, processing oils, pigments, flame retardants, blowing agents and like additives as are known in the art.

The vulcanizable composition may be prepared and blended using any suitable mixing device such as a two-roll mill, an internal mixer (Brabender Plasticorder), a Banbury Mixer, a kneader or a similar mixing device. Blending temperatures and times may range about 15° to 180° C and from about 4 to 10 minutes respectively. After forming a homogeneous mixture of the halogenated elastomer and the optional fillers, processing aids and the like, the mixture is then prepared for vulcanization by the further incorporation of the scorch retarder and curing system of this invention in the mixing device or on a separate mixing device such as a two roll mill, after which the mixture is sheeted out as is well known in the art.

The following examples are illustrative of the invention. In Examples 1–9, the halogenated elastomer employed (designated BI-PMS) was a brominated terpolymer of isobutylene and para-methyl styrene (PMS) having the following characteristics, mixed with antioxidant and stearate:

PMS CONTENT - 1.7 mole %
BROMINE CONTENT - 0.59 mole %

-continued

MOONEY VISCOSITY - 34 [(1 + 8) 125° C. LR]
PHENOLIC ANTIOXIDANT - 0.21 wt %
CALCIUM STEARATE - 1.0 wt %

EXAMPLES 1-9

The brominated polymer described above was compounded, vulcanized and evaluated for curing activity and vulcanizate properties. A series of nine formulations as described in Table 1 were prepared by first compounding 100 parts by weight of the brominated polymer, 60 parts by weight of a reinforcing carbon black (N660 CB) and the indicated amount of stearic acid on a laboratory 2 roll mill at about 25° C. for about 10 minutes. Portions of this master batch were then formulated with a curative mixture of dipentamethylene thiuram tetrasulfide (Tetrone A) and optionally zinc oxide as shown in Table 1 by adding the curative mixture to the rubber stock and milling the mixture on a two roll mill at 25° C. for about 5 minutes. The mixture also included the bismuth salts of this invention in Examples 2, 3 and 5-8 and, for comparative purposes, Example 4 contains a lead carboxylate (Lead Chem All) instead of the bismuth salt.

The curable mixtures were evaluated for vulcanization activity using a Monsanto Oscillating Disc Rheometer and then physical properties of the vulcanizates were evaluated by vulcanizing test pads under the various cure conditions set forth in Table 1 using standard ASTM laboratory test practice.

In Examples 1-4 of Table 1, the bismuth and lead salts are compared to zinc oxide in a dipentamethylene thiuram tetrasulfide (DPTHS-Tetrone A) formulation. A three fold increase in ts2 ODR (160° C) values were realized with the Bi salt but the 30' ODR MH values for the Bi (as well as that of the Pb salt) were substantially below that for the ZnO control shown in Example 9. However, over a period of time the cure state continued to increase to respectable levels. At 190° C a three fold advantage in ts2 was realized with a very large improvement in MH. The behavior of the MH values is in line with what would be desired for bladder applications.

To achieve the necessary cure state levels within a reasonable period of time, the bismuth salts were combined with zinc oxide in Examples 5-8. The concentration effect of the Bi salt was evaluated at two levels: 1 & 2.5 phr at two levels of ZnO (0.25 and 1.0 phr). The quantity of stearic acid was adjusted to reflect the free acid present in the Bismuth Ten Chem. With Ten Chem present t-s2 increases 20 to 80% with acceptable increases in tc-50' & tc90'. The tensile data obtained for a 30' @ 160° C. cure show that the Bi salt does not interfere with good cure development. Modulus development is at least equivalent and tensile strengths significantly greater at equivalent elongations. More importantly upon aging for 7 days at 150° C the compounds containing ZnO at the 1phr level with Bi Ten Chem at the 1.0 and 2.5 levels do not show modulus increases while the control has experienced a 25% increase in 300% modulus. This suggests that compounds containing Bi salts should not develop excessively high modulii

TABLE 1

| Example | 1 | 2 | 3 | 4 | 5 | 6 | 7 | 8 | 9 |
|---|---|---|---|---|---|---|---|---|---|
| BrXP-50* | 100 | 100 | 100 | 100 | 100 | 100 | 100 | 100 | 100 |
| N660 CB | 60 | 60 | 60 | 60 | 60 | 60 | 60 | 60 | 60 |
| Stearic Acid | 1 | 1 | 1 | 1 | 1 | 1 | 1 | 1 | 2 |
| Tetrone A | 1 | 1 | 1 | 1 | 1 | 1 | 1 | 1 | 1 |
| 16% Bi Ten Chem | | 2 | 4 | | 1 | 2.5 | 1 | 2.5 | |
| 36% Lead Chem All | | | | 1.8 | | | | | |
| ZnO (NBS) | 0.5 | | | | 0.25 | 0.25 | 1 | 1 | 1 |
| ODR: 30' @ 160° C.; 3°; no preheat | | | | | | | | | |
| Mh-30, lbf-in | 48 | 18.8 | 20.4 | 28.2 | 45.3 | 40 | 55 | 51.2 | 50.8 |
| Ml, lbf-in | 11 | 11 | 11 | 14.2 | 14.2 | 12 | 14.6 | 14 | 12.4 |
| Mh - Ml, lbf-in | 37 | 7.8 | 9.4 | 14 | 31.1 | 28 | 40.4 | 37.2 | 38.4 |
| tS-2 | 2 | 6.75 | 5.8 | 2.88 | 2.38 | 3 | 2 | 3 | 1.65 |
| tc-50, min | 4 | 11.4 | 11.4 | 8 | 5.75 | 7.5 | 4.38 | 6.25 | 2.93 |
| tc-90, min | 16.8 | 25 | 25.5 | 20.3 | 18.25 | 20.5 | 11.5 | 14.8 | 6.5 |
| Mh-60', lbf-in | | 23 | 26 | 32 | | | | | |
| Mh-90', lbf-in | | 26.4 | 30.5 | 35 | | | | | |
| ODR: 30' @ 190° C.; 3°; no preheat | | | | | | | | | |
| Mh-30, lbf-in | 51.7 | 31.8 | 36.8 | 35.8 | | | | | |
| Ml, lbf-in | 10.7 | 9 | 9.2 | 12.8 | | | | | |
| Mh - Ml, lbf-in | 41 | 22.8 | 27.6 | 23 | | | | | |
| tS-2 | 1 | 2.88 | 3 | 1.88 | | | | | |
| tc-50, min | 1.88 | 13.5 | 12.5 | 11.5 | | | | | |
| tc-90, min | 4.38 | 26.5 | 25.2 | 25.9 | | | | | |
| Mh-60, lbf-in | | 43 | 44 | 46.8 | | | | | |
| Mh-90, lbf-in | | 46 | 45 (77') | 51.4 | | | | | |
| Mh-120, lbf-in | | | | 53.4 | | | | | |
| Tensile Propertires: Cure 30' @ 160° C. | | | | | | | | | |
| Shore A | 62 | 58 | 56 | 58 | 60 | 58 | 60 | 60 | 60 |
| 100% Mod., MPa | 2.519 | 1.158 | 1.25 | 1.452 | 2.027 | 1.892 | 2.301 | 2.09 | 2.12 |
| 300% Mod., MPa | 10.811 | 2.802 | 3.8 | 5.465 | 9.936 | 9.406 | 10.76 + 5 | 10.643 | 8.978 |
| Tensile Str., MPa | 12.578 | 3.379 | 5.565 | 7.711 | 14.005 | 13.918 | 13.57 | 14.288 | 11.589 |
| Elongation, % | 392 | 545 | 544 | 494 | 495 | 490 | 450 | 464 | 475 |
| Tensile Propertires after Air Oven Aging at 150° C. for 168 Hours | | | | | | | | | |
| Shore A | | | | | 62 | 65 | 60 | 60 | 67 |
| 100% Mod. MPa | | | | | 3.286 | 2.446 | 2.512 | 2.196 | 2.788 |
| 300% Mod. MPa | | | | | | 11.074 | 10.971 | 9.47 | 11.148 |
| Tensile Str., MPa | | | | | 14.074 | 11.908 | 12.052 | 10.798 | 12.003 |
| Elongation, % | | | | | 296 | 320 | 328 | 339 | 328 | upon aging, thus resulting in improved retention of such properties as flex fatigue and tear strength.

In summary, the new curatives for halogenated isobutylene based elastomers show very significant improvement in cure control and scorch elimination.

What is claimed is:

1. A curable composition comprising a mixture of a halogenated elastomer selected from the group consisting of chlorinated or brominated butyl rubber and chlorinated or brominated interpolymers of a $C_4$ to $C_7$ isoolefin and a para-alkylstyrene comonomer, a curing agent and an amount of a bismuth carboxylate scorch retarder sufficient to retard the cure of said composition, said retarder having the structure:

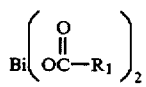

wherein $R_1$ is selected from the group consisting of straight or branched chain alkyl groups having from 4 to about 30 carbon atoms, aromatic groups containing from 6 to about 30 carbon atoms and alkaryl groups containing from 7 to about 30 carbon atoms.

2. The composition of claim 1 containing a zinc compound in an amount effective to cure said composition.

3. The composition of claim 1 wherein R is an alkyl group containing from about 5 to about 22 carbon atoms.

4. The composition of claim 3 wherein said retarder is present in said composition at a level of from about 0.5 to about 8.0 parts by weight per 100 parts by weight of said halogenated elastomer.

5. The composition of claim 1 wherein said halogenated elastomer is a brominated elastomer.

6. A curable composition comprising a mixture of a halogenated interpolymer of a $C_4$ to $C_7$ isoolefin copolymerized with a para-alkylstyrene, said copolymer containing from about 0.5 to about 20 mole % of monomer units of the following structure randomly distributed therein:

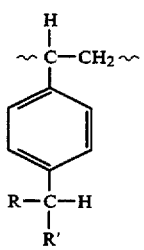

and

-continued

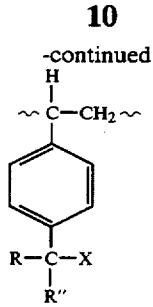

wherein R and R' are independently selected from the group consisting of hydrogen and lower alkyl, R" is independently selected from the group consisting of hydrogen, lower alkyl and X, and X is bromine or chlorine, and wherein the copolymer is substantially free of ring halogen and free of halogen present in the polymer backbone chain;

a curing agent; and an amount of a bismuth carboxylate cure retarder sufficient to retard the cure of said composition, said retarder having the structure:

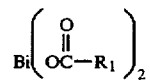

wherein $R_1$ is selected from the group consisting of straight or branched chain alkyl groups having from 4 to about 30 carbon atoms, aromatic groups containing from 6 to about 30 carbon atoms and alkaryl groups containing from 7 to about 30 carbon atoms.

7. The composition of claim 6 wherein said halogenated interpolymer is a terpolymer of isobutylene, para-methylstyrene and monobromo-para-methyl styrene.

8. The composition of claim 7 wherein from about 5 to about 60 mole % of the para methyl styrene monomer units contain a mono-bromomethyl group.

9. The composition of claim 8 wherein said terpolymer has a bromine content in the range of from about 0.1 to about 5 mole %.

10. The composition of claim 6 wherein $R_1$ has 9 carbon atoms.

11. The composition of claim 6 wherein $R_1$ has 5 carbon atoms.

12. The composition of claim 6 wherein R, R' and R" are each hydorgen.

13. The composition of claim 12 further containing zinc oxide in an amount effective to cure said composition.

14. The composition of claim 6 wherein said retarder is present in said composition at a level of from about 0.5 to about 8.0 parts by weight per 100 parts by weight of said halogenated interpolymer.

15. The composition of claim 6 which contains a sulfur-containing curing agent.

16. The composition of claim 15 wherein said sulfur-containing curing agent is dipentamethylene thiuram tetrasulfide.

17. The composition of claim 6 further containing carbon black reinforcing filler.

18. A method for preparing a cured composition comprising heating the composition of claim 13 at a temperature and for a period of time sufficient to cure said composition.

19. A vulcanized composition prepared by the method of claim 18.

* * * * *